Feb. 4, 1941. C. R. DOWDY ET AL 2,230,485

THICKNESS GAUGE

Original Filed March 11, 1936

INVENTORS
Charles R. Dowdy and
Fred Deopke
Wheeler, Wheeler and Wheeler
ATTORNEYS Patented Feb. 4, 1941

2,230,485

UNITED STATES PATENT OFFICE 2,230,485

THICKNESS GAUGE

Charles R. Dowdy, Milwaukee, Wis., and Fred Doepke, deceased, late of St. Petersburg, Fla., by Annie Doepke, Fred C. Doepke, and William G. Hanson, executors, Milwaukee, Wis., assignors to Wrought Washer Manufacturing Company, Milwaukee, Wis., a corporation of Wisconsin Original application March 11, 1936, Serial No. 68,250. Divided and this application April 3, 1939, Serial No. 266,526

2 Claims. (Cl. 33—147)

Our invention relates to improvements in thickness gauges.

The object of our invention is to provide a thickness gauge wherein the possible inaccuracy of indication of the thickness of material to be gauged is reduced.

More particularly stated, it is the object of our invention to provide thickness gauges in which the mechanical elements between the actual work engaging members and the pointer on the indicator dial associated therewith are directly abutting and are divorced from the mechanical members in the control of the person using the gauge whereby to minimize the effect of variations of pressure or differences in the strength used in applying or working the instrument.

Another object of our invention is to provide a thickness gauge which enables an operator to gauge successive pieces of material with extreme rapidity without sacrificing accuracy of gauge indication.

In the drawing.

Like parts are identified by the same reference characters throughout the several views.

Figures 1, 2, 3:
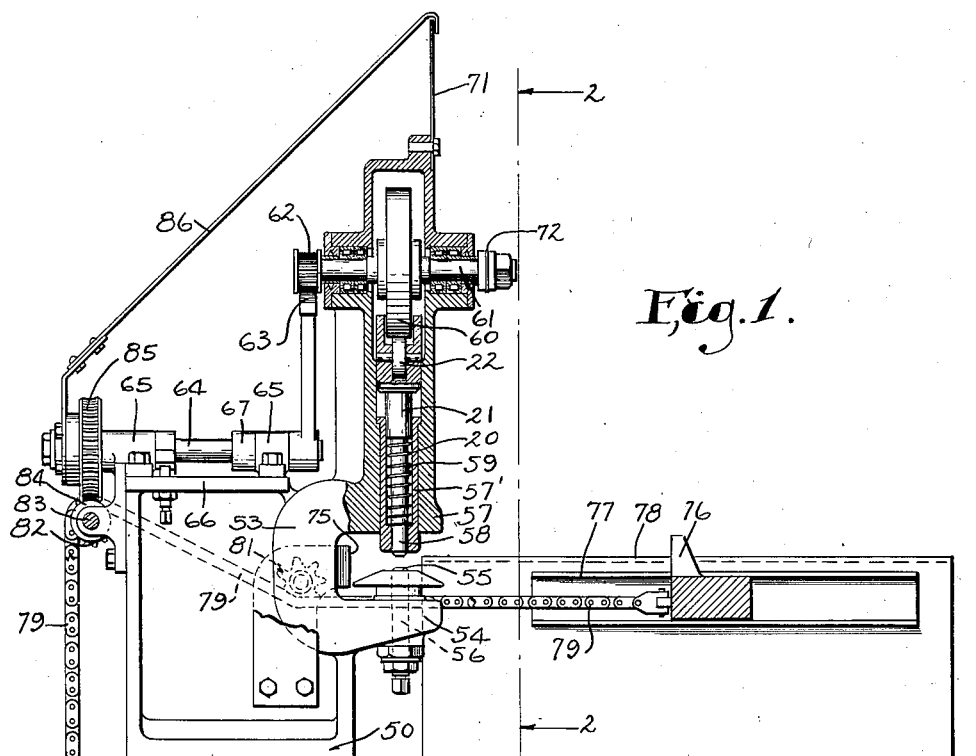
Fig. 1 is a side elevation of our thickness gauge generally intended for bench use, portions of the gauge being shown in vertical section.
Fig. 2 is a section on line 2—2 of Fig. 1.
Fig. 3 is a detail of the pedal and spring for operating our bench type gauge.

Our thickness gauge shown in the drawings uses the same general wedge principle disclosed in our Patent No. 2,152,880, of the application for which, Serial No. 68,250, filed March 11, 1936, this is a division. In the description hereinafter set forth, it will be seen that the gauge plunger is urged against a cam wheel with which an indicator is rigidly affixed, thus providing a visual indication of the exact position of the wedge (cam wheel) in any given position of the plunger.

In our bench type structure, a frame 50 supports a C jaw 53, the lower leg 54 of which supports an anvil 55 in threaded engagement at 56 with the leg 54. A plunger 58 is mounted for reciprocation in the upper leg 57 of the C jaw 53, a bushing 57' being provided for additional accuracy. The bushing 57' is provided with an enlarged bore at 59 to receive plunger spring 20 which bears against the roller head 21 provided with a roller 22 to bear against a cam wheel 60 mounted in the upper portion of the frame 50. The cam wheel 60 is directly mounted upon a cam wheel shaft 61 upon which we provide a pinion 62 in engagement with a gear sector 63 mounted upon an actuator shaft 64. This actuator shaft is mounted in pillow blocks 65 on a platform 66 forming part of the frame 50.

Extending laterally from the actuator shaft 64 is an actuator lever 67 to which a spring link 68 is connected as shown clearly in Fig. 2. This link is provided with a spring connection at 69 to a pedal 70 upon which the foot of the operator may be pressed whereby to rotate the actuator shaft 64 and oscillate the gear sector 63. When the gear sector 63 oscillates pinion 62 and cam wheel 60 are caused to rotate and to actuate the plunger 58 against the pressure of plunger spring 20, thus reciprocating the plunger 58 toward the anvil 55. The degree of rotation of the cam wheel 60 is indicated by the oscillation of a pointer 72 with reference to a fixed, calibrated dial 71, and since the slight movement of the plunger 58 is reflected in a considerable movement of the pointer 72 an extremely accurate indication of the thickness of an object between the anvil and plunger is obtained.

It will be noted that the angle of the wedge 24 and the eccentricity of the cam wheel 60 is such that a considerable movement of the wedge or surface of the cam wheel is required to effect even slightly an axial movement of the movable plungers 18 or 58.

Cam wheel 60 may be formed as a mere "eccentric," it being understood that the wedge principle is a desirable means to obtain the adjustment of the indicator mechanism in accord with displacement of the plunger.

As an additional equipment for our bench type gauge we provide a measuring device to quickly determine the lateral dimensions of material to be gauged. This measuring device includes a fixed stop 75 in the base of the C jaw 53 and the material to be measured is inserted in the C jaw with a margin abutting the stop 75. A sliding stop 76 is installed upon a slide 77 beneath the surface 78 of the bench upon which the material to be gauged or measured is rested. The sliding stop 76 is urged into contact with the margin of the material by means of a chain 79 and a counterweight 80, the chain being guided over sprockets 81 and 82. Sprocket 82 is mounted to rotate with the shaft 83 which is in the form of a worm 84 in engagement with a worm wheel 85 mounted for free rotation upon actuator shaft 64. A pointer 86 rigidly connected to the worm wheel 85 extends over and around the margin of the dial 71 which is calibrated in feet or inches as desired for any given measuring operation.

From this description it will be seen that in accomplishing a measuring operation the operator or user of our device can withdraw the stop 76 to its outermost position away from the C jaw 53, whereupon a sheet of material may be inserted between the plunger and the anvil with one margin abutting the stop 75 and when the sheet of material is in position upon the table surface 78, the sliding stop 76 may be brought into abutment with the outer margin of the sheet thus rotating sprocket 82 and the worm 84 whereby to position the worm wheel and the pointer 86 to give an accurate reading on the dial 71 indicative of the dimension of the sheet between stops 75 and 76.

From the above description, it will be seen that we have provided a thickness gauge in which the reading upon the calibrated dial is extremely accurate. This is especially true because of the fact that the strength of the operator is not reflected at all in the pressure brought to bear on the movable plunger 58. The only pressure effective for this purpose is the pressure differential between the springs 59 and 69.

We claim:

1. In a thickness gauge, spaced jaw members having a fixed anvil and a movable plunger in opposed relation, a plunger spring for urging the plunger away from the anvil, a cam wheel in abutment with a portion of the plunger whereby to adjustably resist the movement of the plunger spring, an indicator directly responsive to the rotative position of the cam wheel whereby to give visual indication of the displaced position of the plunger and a treadle like actuating member provided with resilient connection with the cam wheel for rotation thereof to impositively force the plunger toward the anvil.

2. In a thickness gauge, spaced jaw members having a fixed anvil and a movable plunger in opposed relation, a plunger spring for urging the plunger away from the anvil, a cam wheel in abutment with a portion of the plunger whereby to adjustably resist the movement of the plunger spring and an indicator directly responsive to the rotative position of the cam wheel whereby to give visual indication of the displaced position of the plunger, the cam wheel having a cam shaft provided with a pinion, an actuator shaft provided with a gear sector in mesh with said pinion, an actuator arm for the cam shaft for movement with the sector, and a treadle resiliently connected with said arm for actuating said sector and said cam wheel.

ANNIE DOEPKE,
FRED C. DOEPKE,
WILLIAM G. HANSON,
Executors of the Estate of Fred Doepke, Deceased.

CHARLES R. DOWDY.